(12) United States Patent
Byatt

(10) Patent No.: US 6,293,560 B1
(45) Date of Patent: Sep. 25, 2001

(54) SUSPENSION ARRANGEMENT FOR A WHEELED CONVEYANCE

(75) Inventor: John William Byatt, Western Australia (AU)

(73) Assignee: Buzz Bike International Pty. Ltd., South Perth (AU)

( * ) Notice: Subject to any disclaimer, the term of this patent is extended or adjusted under 35 U.S.C. 154(b) by 0 days.

(21) Appl. No.: 09/446,079
(22) PCT Filed: Jun. 16, 1998
(86) PCT No.: PCT/AU98/00463
§ 371 Date: Feb. 7, 2000
§ 102(e) Date: Feb. 7, 2000
(87) PCT Pub. No.: WO98/57839
PCT Pub. Date: Dec. 23, 1998

(30) Foreign Application Priority Data

Jun. 17, 1997 (AU) .................................. PO 7434

(51) Int. Cl.⁷ .............................. B62B 5/02; B62K 13/00
(52) U.S. Cl. ........................................... 280/5.2; 280/7.15
(58) Field of Search .............................. 280/5.2, 7.1, 7.15

(56) References Cited

U.S. PATENT DOCUMENTS

| 3,649,981 | * | 3/1972 | Woodworth | 280/5.2 |
| 3,942,821 | | 3/1976 | Bock . | |
| 4,274,647 | * | 6/1981 | Drake, Jr. | 280/87.04 |
| 5,064,208 | | 11/1991 | Bibollet . | |
| 5,655,615 | * | 8/1997 | Mick | 280/5.2 |

FOREIGN PATENT DOCUMENTS

| 19531804 | 3/1997 | (DE) . |
| 0399615 | 11/1990 | (EP) . |
| 9746443 | 12/1997 | (WO) . |

* cited by examiner

Primary Examiner—Brian L. Johnson
Assistant Examiner—Matthew Luby
(74) Attorney, Agent, or Firm—Rothwell, Figg, Ernst & Manbeck

(57) ABSTRACT

A suspension arrangement for a wheeled conveyance, the suspension arrangement including a mounting member, at least two pairs of wheels and a biasing structure, the mounting member supporting thereon in an operable manner the pairs of wheels, the biasing structure acting between the mounting member and a remote point so as to cause the mounting member to pivot about a pivot point provided thereon and through which the mounting member is joined to the remainder of the conveyance.

10 Claims, 6 Drawing Sheets

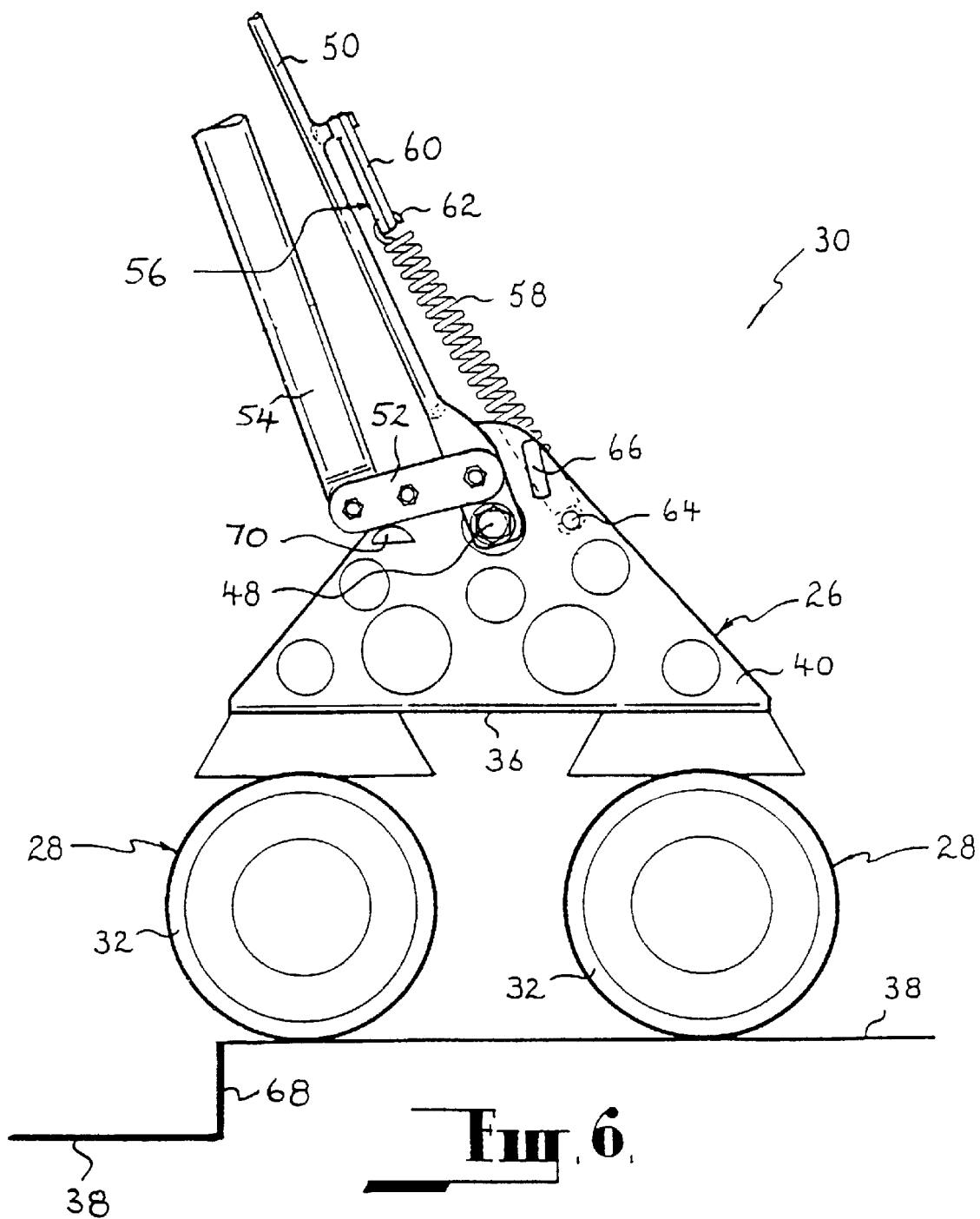

US 6,293,560 B1

SUSPENSION ARRANGEMENT FOR A WHEELED CONVEYANCE

FIELD OF THE INVENTION

The present invention relates to a suspension arrangement for a wheeled or self-laying tracked conveyance. More particularly, the suspension arrangement of the present invention is intended for use in providing substantially smooth transition over uneven terrain for the conveyance on which it is provided. The suspension arrangement of the present invention is further intended most particularly for use on bicycles and motorcycles but is not to be limited thereto.

DISCUSSION OF THE PRIOR ART

A number of attempts have been made previously to provide a gliding or skating sensation when utilising a bicycle or similar conveyance. In this regard reference may be made to U.S. Pat. No. 4,863,182, Australian Patent Application 32359/89 and British Patent Application 2 122 557. Each of these documents discloses a bicycle like conveyance on which the front wheel, forks and handle bars have been replaced by a single pair of small wheels, for example skateboard wheels, mounted transversely on a single axle. This arrangement requires the rider to steer entirely by shifting their body weight which in turn acts on a truck supporting the axle of the pair of wheels. Many riders find this an arrangement that is difficult to operate and may be dangerous as a result.

Another factor contributing to the dangerous nature of the prior art is the inability of the pair of small wheels to ride over even small obstacles. As such, a rider encountering an obstacle at speed may be thrown forward dangerously.

Wheelchairs and other mobile chassis suffer from similar problems in that whilst such can travel well over smooth surfaces there can be problems of instability when transversing even small obstacles, particularly if castor-type wheels are utilised. The suspension systems for such vehicles are often particularly complicated and consequently expensive.

The suspension arrangement of the present invention has as one object thereof to overcome substantially the above problems associated with the prior art.

Throughout the specification, unless the context requires otherwise, the word "comprise" or variations such as "comprises" or "comprising", will be understood to imply the inclusion of a stated integer or group of integers but not the exclusion of any other integer or group of integers.

BRIEF DESCRIPTION OF THE INVENTION

In accordance with the present invention there is provided a suspension arrangement for a wheeled or self-laying tracked conveyance, the suspension arrangement characterised by a mounting member, at least two pairs of wheels and a biasing means, the mounting member supporting thereon in an operable manner the pairs of wheels, the biasing means acting between the mounting member and a remote point so as to cause the mounting member to pivot about a pivot point provided thereon and through which the mounting member is joined to the remainder of the conveyance, wherein the pairs of wheels are preferably spaced apart longitudinally along the mounting member whereby action of the biasing means acts to lift a forwardmost portion of the mounting member and in turn the wheel pair provided thereon.

Preferably, the pairs of wheels are mounted on axles extending transversely with respect to the mounting member.

The pivot point of the mounting member is preferably provided directly or indirectly with respect to a pair of forks or a single piston. The forks or piston are in turn connected to a steering means, for example a pair of handle bars, whereby in normal use the weight of a rider acting downwardly through the conveyance, handle bars and front forks or piston causes extension of the biasing means and results in both wheel pairs on the mounting member contacting a supporting surface. Upon the rider releasing the downward pressure on the mounting member the biasing means acts to lift the forwardmost portion of the mounting member and in turn the forwardmost wheel pair provided thereon. In this manner the rider effectively controls the operation of the suspension arrangement in mounting obstacles. A rider may determine that an obstacle is approaching, pull up on the handle bars and thereby allow operation of the suspension arrangement.

It is to be understood that the suspension arrangement of the present invention may be utilised as at least the forward wheels on a variety of conveyances including bicycles, tricycles, motorcycles, wheelchairs, trolleys, go-carts, prams. scooters and land sail-boards.

DESCRIPTION OF THE DRAWINGS

The suspension arrangement of the present invention will now be described, by way of example only, with reference to one embodiment thereof and the accompanying drawings, in which:

FIG. 6 is a side elevational view of the mounting member of FIG. 2 showing the first fork members having moved with respect to the second fork members to absorb the shock of mounting an obstacle.

DESCRIPTION

Figure 1:
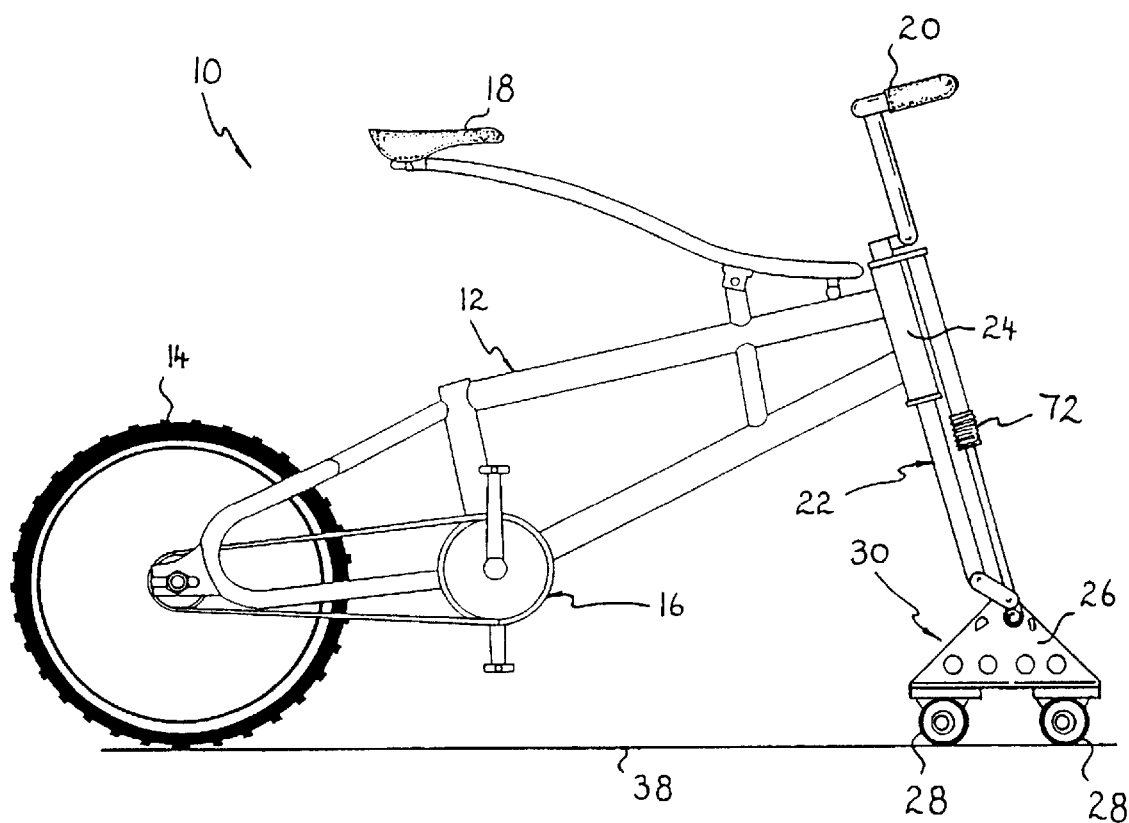
FIG. 1 is a side elevational view of a bicycle to whose front forks the suspension arrangement of the present invention is fitted.

In FIG. 1 there is shown a bicycle 10 having a frame 12, a rear wheel 14, a drive means 16 and a seat 18. The bicycle 10 is further provided with handle bars 20 and front forks 22. The handle bars 20 and front forks 22 are rotatably located through a hollow neck 24 of the frame 12. The front forks 22 have provided at a lower end thereof a pivotally located mounting member 26 supporting thereon two wheel pairs 28, the mounting member 26 and wheel pairs 28 in part comprising a suspension arrangement 30.

Figure 2:
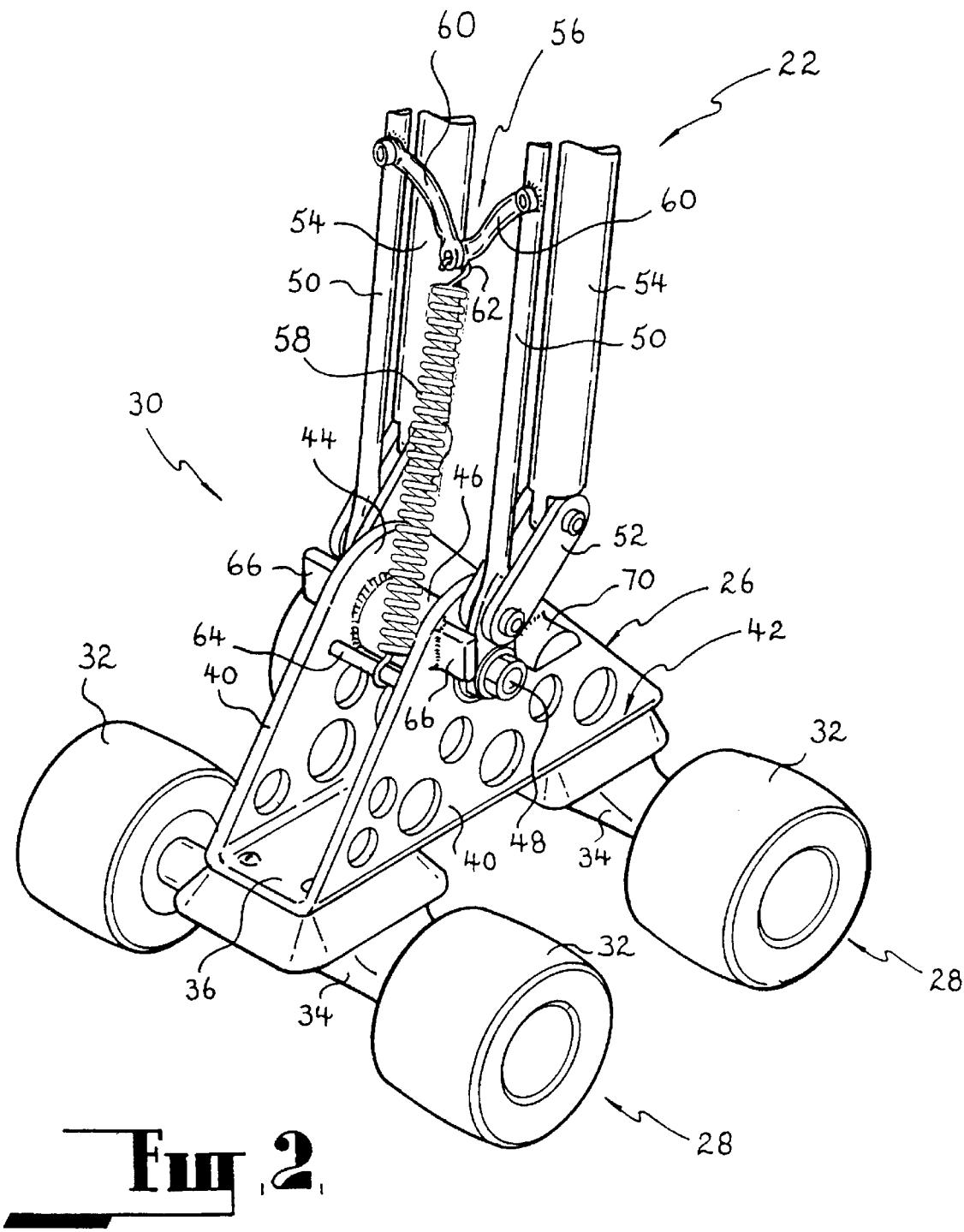
FIG. 2 is an upper perspective view of the suspension arrangement of FIG. 1 showing the mounting member and biasing means thereof.
Figure 3:
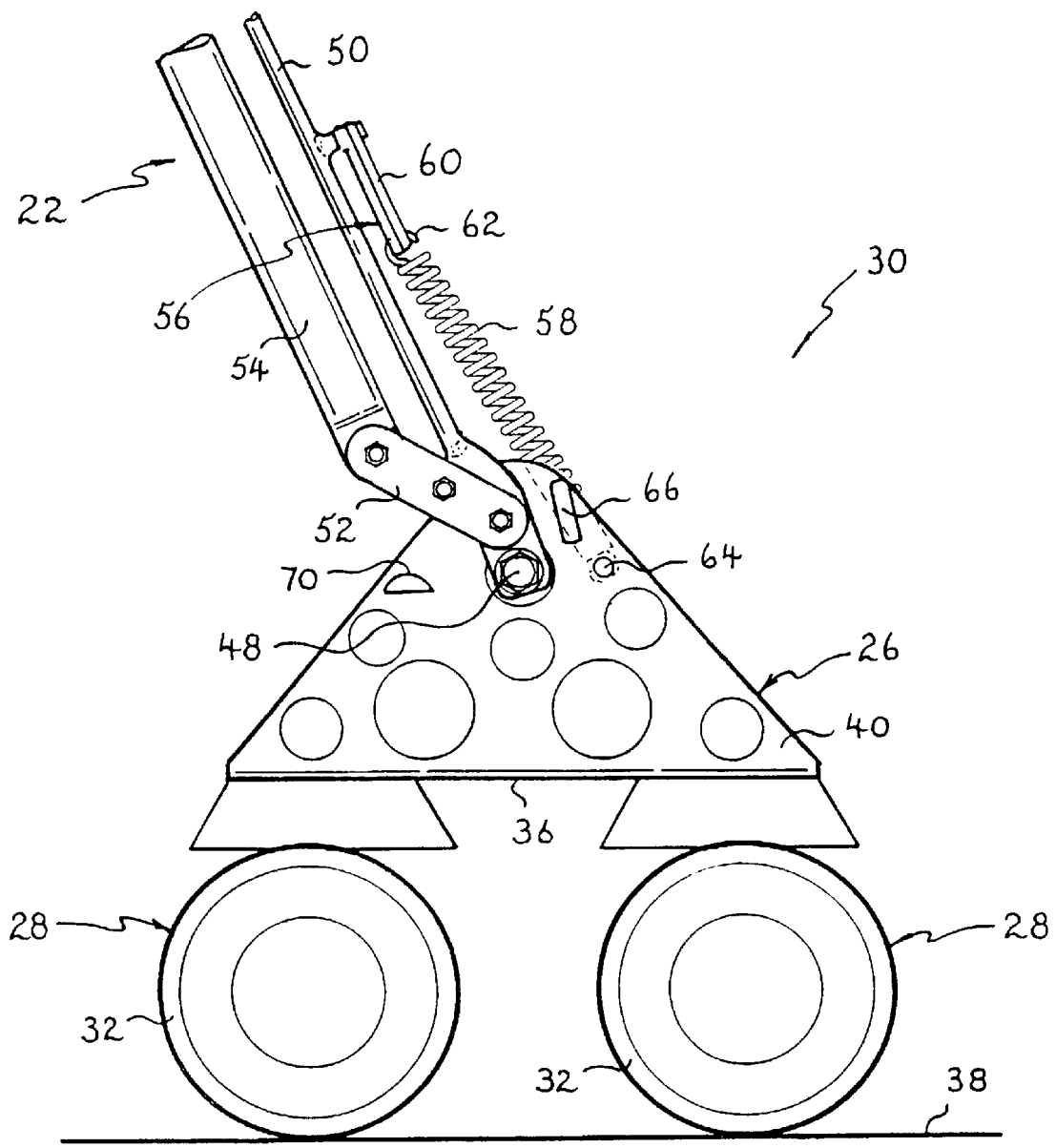
FIG. 3 is a side elevational view of the mounting member of FIG. 2 with the weight of the bicycle bearing thereon and showing the biasing means in an extended state.
Figure 4:
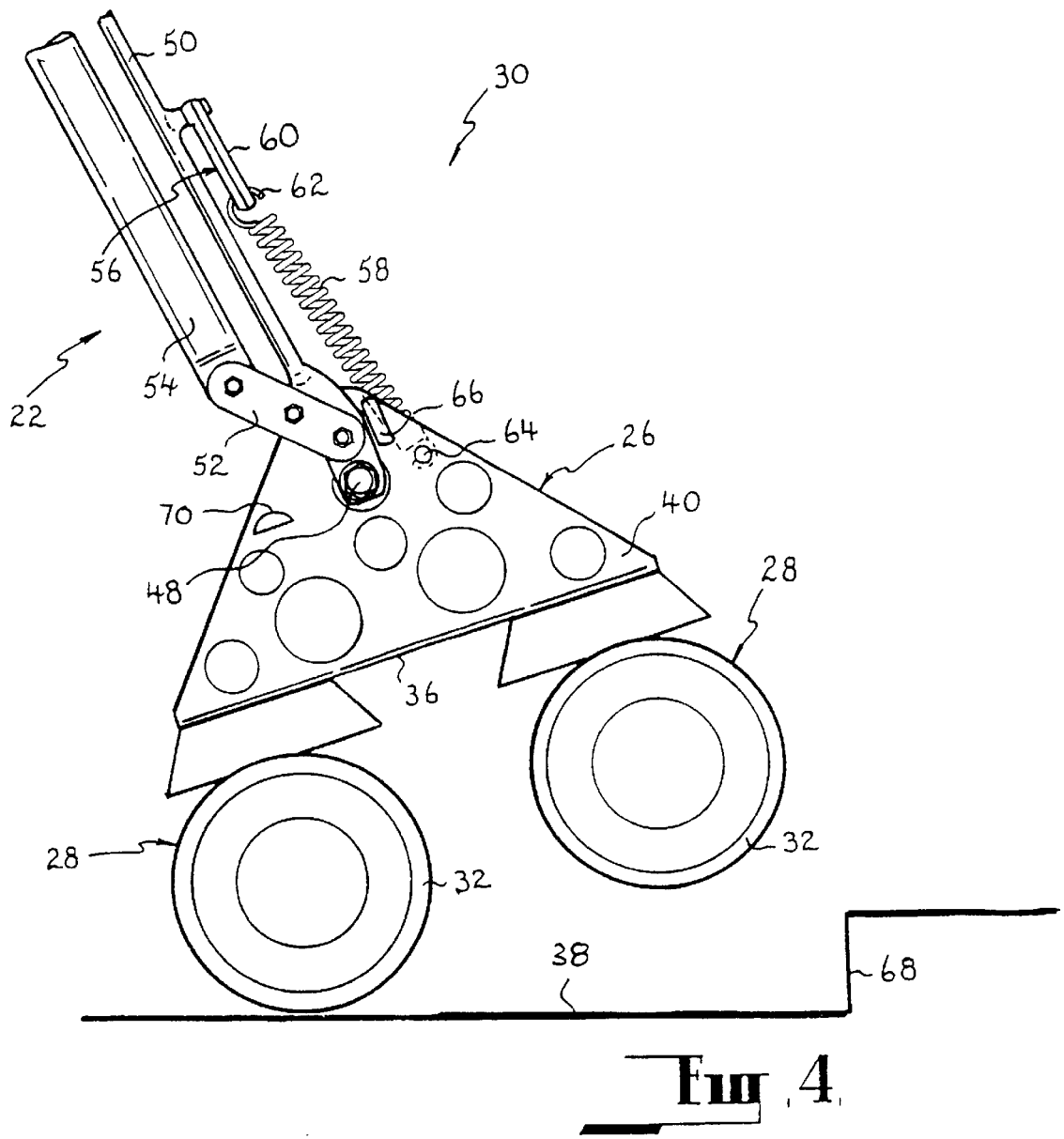
FIG. 4 is a side elevational view of the mounting member of FIG. 2 with the weight relieved therefrom and allowing pivoting of the suspension arrangement.

In FIGS. 2 to 4 there is shown the suspension arrangement 30 comprising the mounting member 26 and wheel pairs 28. The wheel pairs 28 are provided in the form of skateboard wheels 32 mounted on a transverse axle 34. The axles 34 having a flexibly resilient mounting to a base member 36 of the mounting member 26 to allow the wheels 32 to remain in contact with a surface 38 over which they are travelling even when the mounting member 26 is not positioned perpendicularly with respect thereto, in a similar manner to that of a skateboard.

The mounting member 26 further comprises a pair of flanges 40 extending upwardly from the base member 36 in a substantially opposed and parallel manner. The flanges 40 are provided in a substantially triangular form, being broadest at their base 42 at which they are attached/formed integrally with the base member 36. Adjacent an apex 44 of each flange 40 there is provided a pivotal mounting to the forks 22 comprising a hollow tube 46 extending between the apex 44 of the flanges 40 and through which is received a bolt 48. The bolt 48 further locates about the pivotal mounting a first pair of fork members 50.

Each fork member 50 has fixedly attached thereto an intermediate member 52 connecting in turn to a secondary mounting member such as a fork member 54 of a second pair of fork members. The fork members 54 extend upwardly and converge to form a neck portion (not shown) that is received rotatably through the neck 24 of the frame 12 in known manner.

The fork members 50 have extending therebetween a first fixing point 56 for a biasing means, for example a spring 58. The fixing point 56 comprising a pair of members 60 mounted to the members 50 and defining a pair of matching apertures through which a hook 62 of the spring is received. The spring 58 is located at its other end about a lug 64 projecting between the flanges 40. The lug 64 is spaced forwardly with respect to the tube 46 such that contraction of the spring 58 will cause the mounting member 26 to pivot about the pivot point described by the tube 46 and bolt 48. It is to be understood that the lug 64 may be similarly provided as a forwardly projecting lug from the tube 46 and achieve the same function.

The flanges 40 each have a stop member 66 provided thereon and located forwardly of the first fork members 50. Upon pivotal movement of the mounting member 26 induced by the spring 58 the stop members 66 engage the first fork members 50 to limit that pivotal movement.

Figure 5:
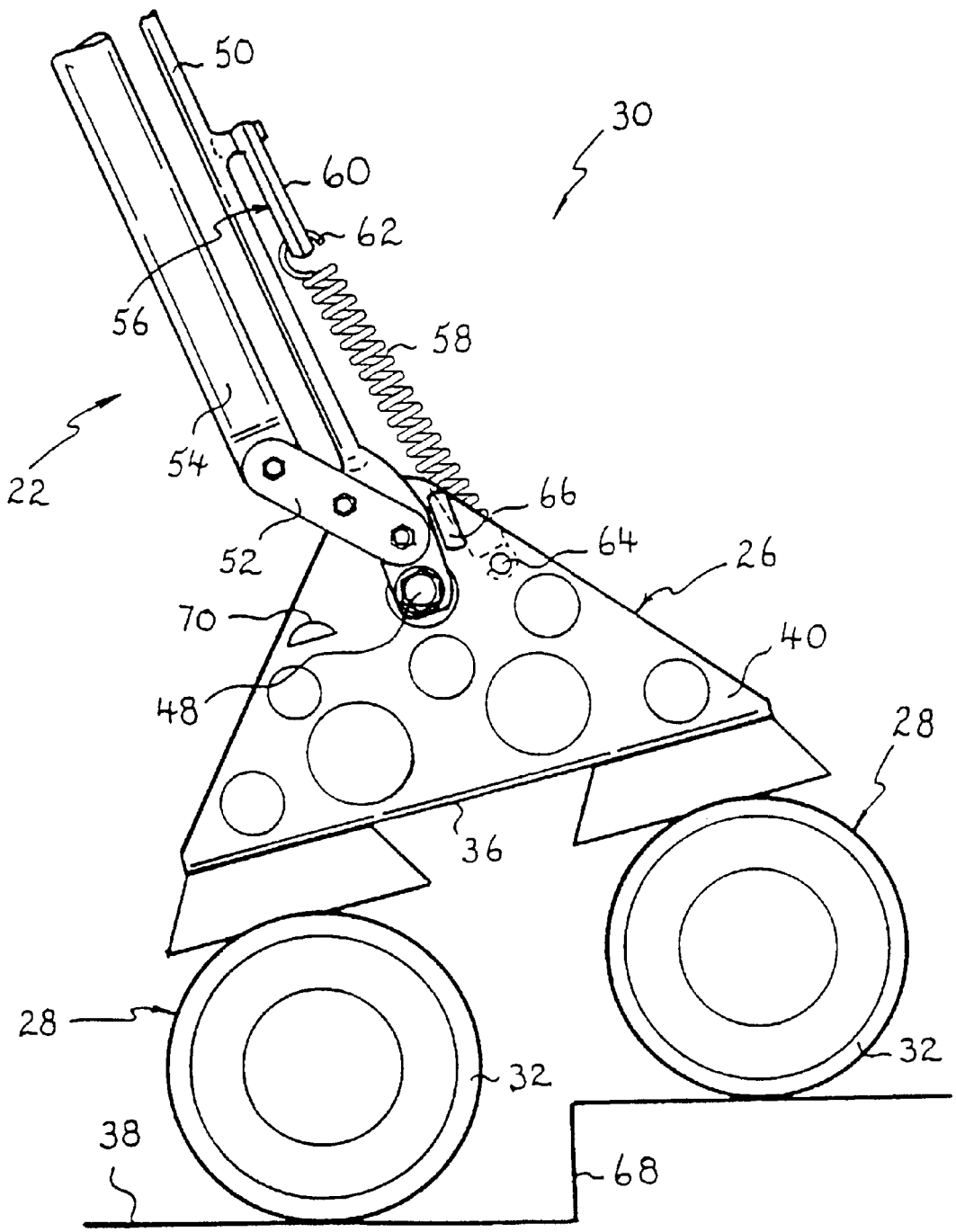
FIG. 5 is a side elevational view of the mounting member of FIG. 2 with the weight relieved therefrom and showing the biasing means contracted to raise the forwardmost wheel pair.

In FIGS. 4 to 6 there is shown a step 68 in the surface 38. In FIG. 4 an upward force 69 exerted by the rider (not shown) allows the mounting member 26 to pivot upwardly as shown by arrow 71. The spring 58 is seen in a contracted state drawing the forwardmost wheel pair 28 upwardly and in position to best move over the step 68. The stop members 66 are notably in engagement with the first fork members 50 thereby limiting the pivotal movement of the mounting member 26 about the tube 46 and bolt 48.

The second fork members 54 are movable with respect to the first fork members 50 through the use of the intermediate members 52, as can be seen in FIG. 6. Heavy upward or downward pressures can be absorbed by the first fork members 50 moving upwardly with respect to the second fork members 54. A further biasing means 72, shown in FIG. 1, is provided in the connection between the first and second fork members 50 and 54 to either bias the first fork members 50 downwardly or the second fork members 54 and the remainder of the bicycle 10 in an upward direction. A lower stop member 70 is provided on each flange 40 rearwardly of the bolt 48 to limit downward movement of the intermediate members 52 and thereby limit downward travel of the second fork members 54 with respect to the first fork members 50.

In use, a rider (not shown) may mount the bicycle 10 in known manner and may operate the drive means 16 of the bicycle 10 also in known manner. With the weight of the bicycle 10 and also the weight of a rider being transferred downwardly through the front forks 22 the suspension arrangement 30 is positioned such that each wheel pair 28 is in contact with the surface 38 over which the bicycle 10 is being ridden, as is shown in FIGS. 1 and 3.

In the position of the suspension arrangement 30 shown in FIGS. 1 and 3 the spring 58 is stretched between the lugs 64 and fixing point 56 under the weight of the bicycle 10 and the rider. Any upwardly or downwardly directed sudden shocks may be absorbed by the biasing means (not shown) utilised in the connection between the first and second fork members 50 and 54 whereby the second fork members 54 move downwardly with respect to the first fork members 50 such that the intermediate member 52 moves towards the stop members 70 of the flanges 40. This biasing means is arranged such that at rest the second fork members 54 are moved or biased upwardly with respect to the first fork members 50.

Upon a rider of the bicycle 10 identifying a step 68 in the surface 38 over which the bicycle 10 is travelling he may exert a brief upward pull on the handle bars 20 which relieves downward pressure through the forks 22 such that the mounting member 26 is caused to pivot about the bolt 48 thereby "kicking up" the forwardmost wheel pair 28 to mount the step 68 in a smooth manner. The spring 58 acting through the lug 64 causes the rotation in the mounting member 26 as noted hereinabove.

As the rearmost wheel pair 28 subsequently mounts the step 68 this shock may be absorbed in the previously described manner through the biasing means (not shown) provided between the first fork members 50 and the second fork members 54. These features contribute to a comparatively smooth ride over fluctuations in terrain for the rider of the bicycle 10. Such is the case also if the rider does not identify the step 68 prior to the bicycle 10 travelling thereover as the bias in the mounting member 28 induced by the spring 58 is such that upon encountering a step 68 of this nature the suspension arrangement 38 will travel smoothly thereover rather than simply abutting against the step 68 and causing either a very rough ride or actually causing the rider to be thrown from the bicycle 10 as has been the case with many prior art arrangements.

It is envisaged that the particular form of the mounting member 26 may be varied in that the materials from which the member is constructed may be altered without departing from the scope of the present invention. Further, the exact nature of the wheel pairs 28 may similarly be altered without effecting the scope of the present invention and it is envisaged that even a self-laying tracked arrangement may be utilised. Still further, a single piston may replace the pair of fork members 54 to function as a secondary mounting member, the intermediate members 52 attaching thereto in the same manner.

It is further envisaged that forms of suspension other than the standard skateboard truck may be utilised with the present invention. For example, a form of independent suspension for each wheel provided on the mounting member 26 may be utilised, such as a cantilever arrangement.

It is still further envisaged that the suspension arrangement of the present invention may be applied in a similar manner to other conveyances including motor cycles, wheelchairs, trolleys, go-carts, land sail-boards, prams and scooters. It is to be appreciated that this list is not exhaustive.

Modifications and variations such as would be apparent to the skilled addressee are considered to fall within the scope of the present invention.

What is claimed is:

1. A suspension arrangement for a wheeled or self-laying tracked conveyance, the suspension arrangement comprising a mounting member, at least two pairs of wheels and a biasing means, the mounting member supporting thereon in an operable manner the pairs of wheels, the biasing means acting between the mounting member and a remote point so as to cause the mounting member to pivot about a pivot point provided thereon and through which the mounting member is joined to the remainder of the conveyance, wherein the pairs of wheels are spaced apart longitudinally along the mounting member whereby action of the biasing means acts to lift a forwardmost portion of the mounting member and in turn the wheel pair provided thereon, the mounting member is connected to a secondary mounting member by way of the pivot point, and the biasing means is connected to the secondary mounting member in one of a direct and an indirect manner at a point remote to the mounting member, wherein there is provided at least a single intermediate member between the pivot point and the secondary mounting member, whereby the connection between the intermediate member and the secondary mounting member is pivotable as is that connection between the pivot point and the intermediate member.

2. A suspension arrangement according to claim 1, characterised in that the pairs of wheels are mounted on axles extending transversely with respect to the mounting member.

3. A suspension arrangement according to claim 1, characterised in that the mounting member further comprises a base member to which the wheel pairs are mounted and two substantially opposed upstanding flange members, the flange members defining therebetween the pivot point.

4. A suspension arrangement according to claim 1, characterised in that the biasing means acts on the mounting member at a point forward of the pivot point in the normal use of the conveyance such that the forward pair of wheels are biased upwardly.

5. A suspension arrangement according to claim 4, characterised in that the mounting member is provided with one or more stop means to prevent over rotation of the mounting member with respect thereto.

6. A suspension arrangement according to claim 1, characterised in that the weight of the conveyance and any rider thereon causes the extension of the biasing means and each wheel pair to rest on a surface over which the conveyance is to travel or be at rest, whilst any relief of that weight allows the biasing means to cause the mounting member to pivot.

7. A suspension arrangement according to claim 1, characterised in that the secondary mounting member is provided with a further biasing means allowing absorption of shocks received through the suspension arrangement, particularly those received through the rear wheels thereof once they mount an obstacle over which the forward wheels have previously travelled.

8. A suspension arrangement according to claim 7, characterised in that there is provided at least a single intermediate member between the pivot point and the secondary mounting member, whereby the connection between the intermediate member and the secondary mounting member is pivotable as is that connection between the pivot point and the intermediate member.

9. A suspension arrangement according to claim 8, characterised in that a stop member is provided to engage the intermediate member to limit movement thereof.

10. A bicycle or tricycle on which is provided a suspension arrangement according to claim 1.

* * * * *